Oct. 5, 1937.  H. H. TIMIAN ET AL  2,094,860
ENGINE
Filed Dec. 23, 1932  5 Sheets-Sheet 1
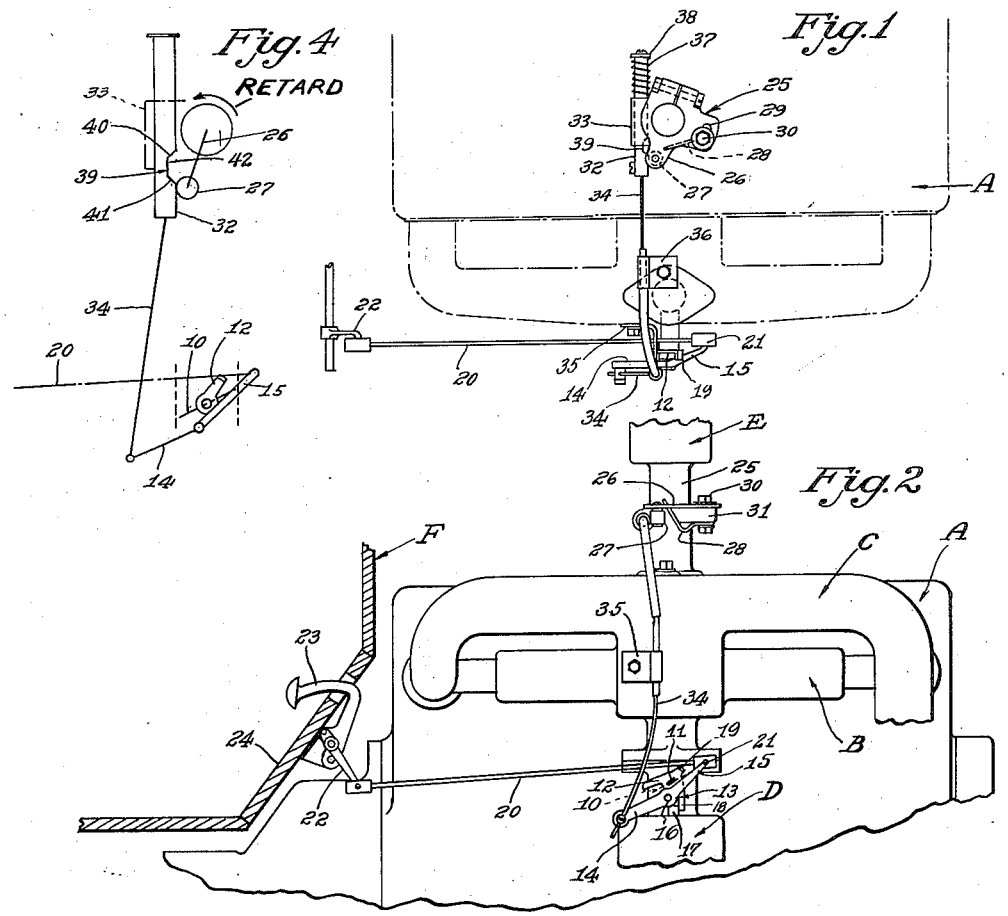
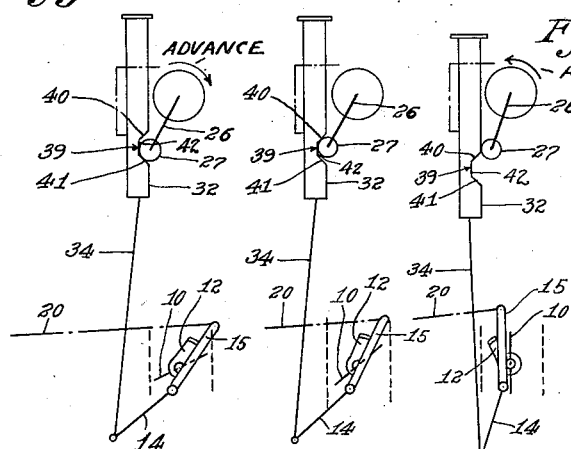
INVENTORS.
Harold H. Timian
Lewis P. Kalb
ATTORNEY.

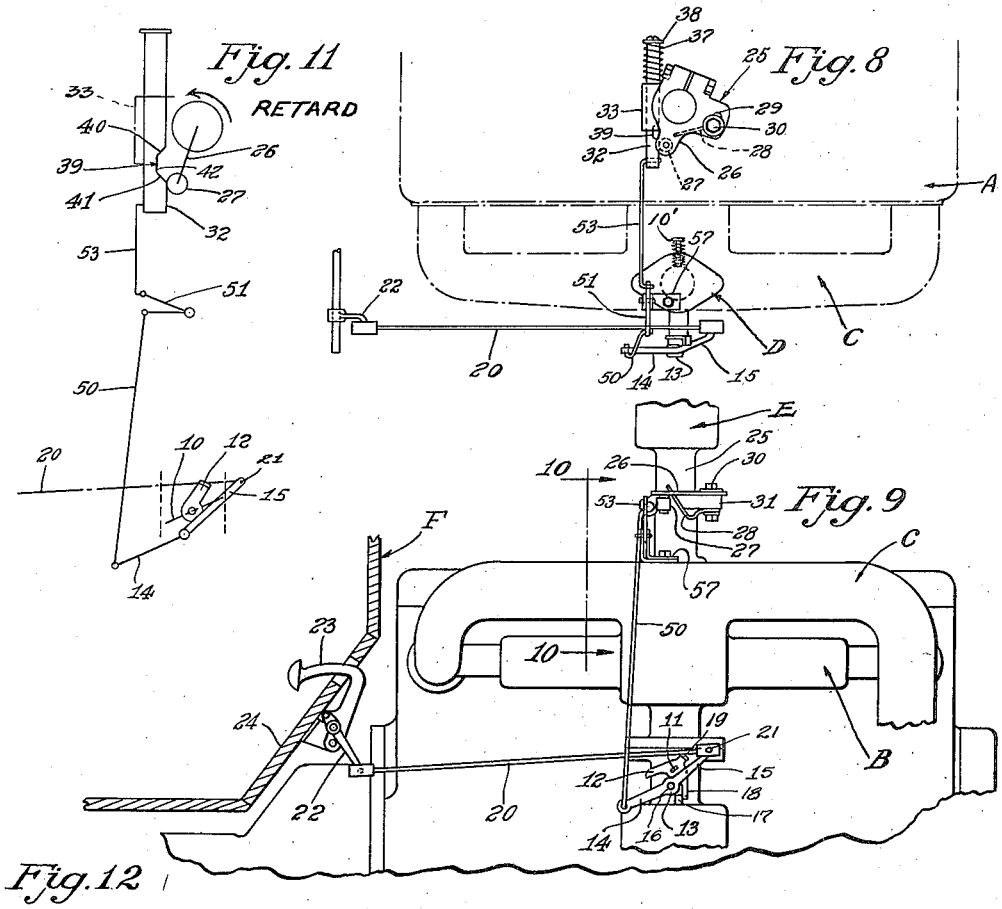

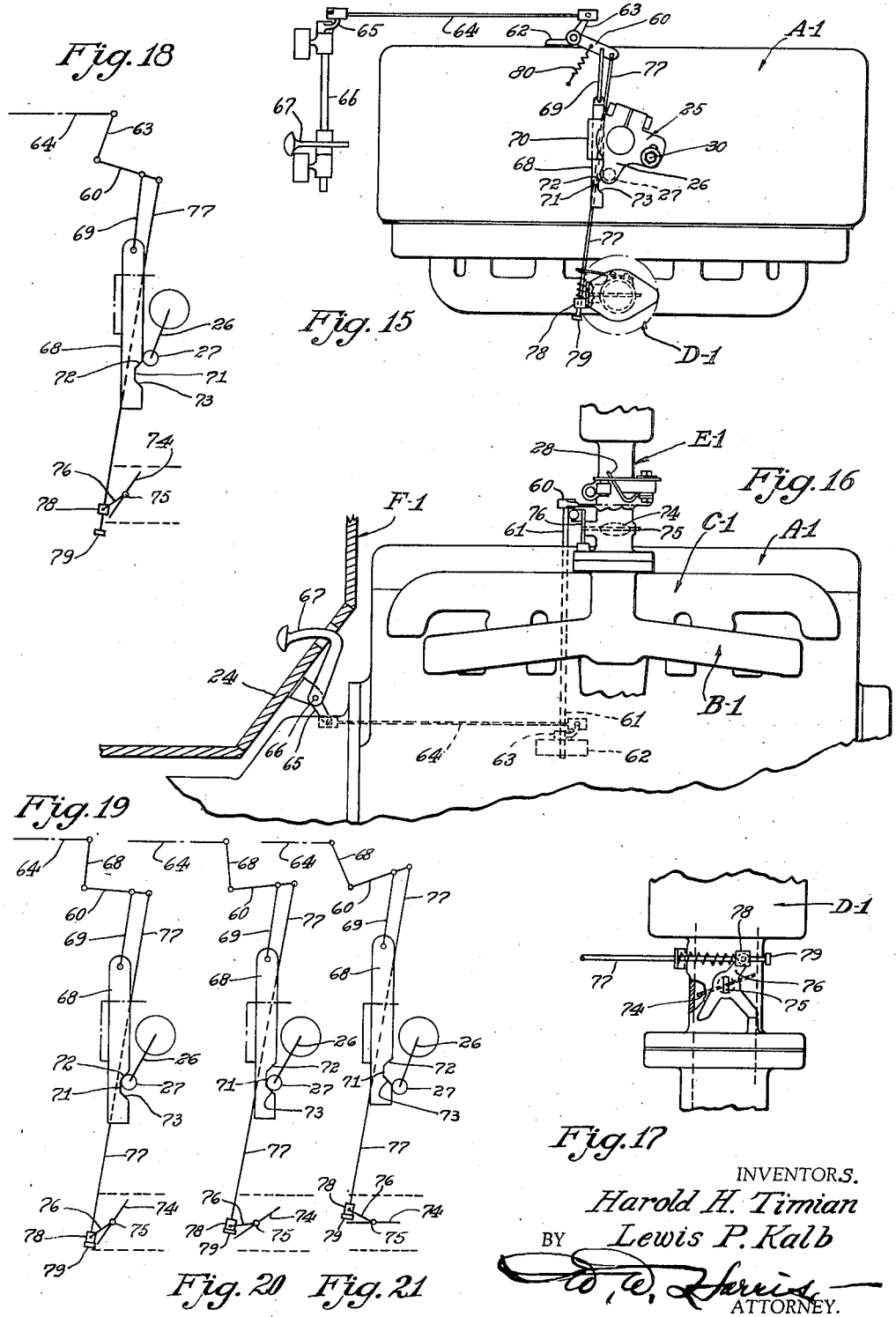

Oct. 5, 1937.  H. H. TIMIAN ET AL  2,094,860
ENGINE
Filed Dec. 23, 1932  5 Sheets-Sheet 4
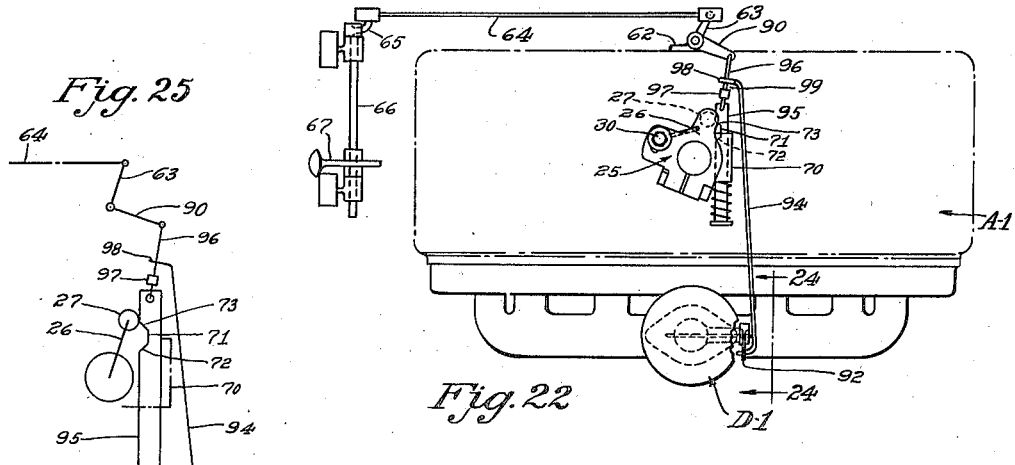
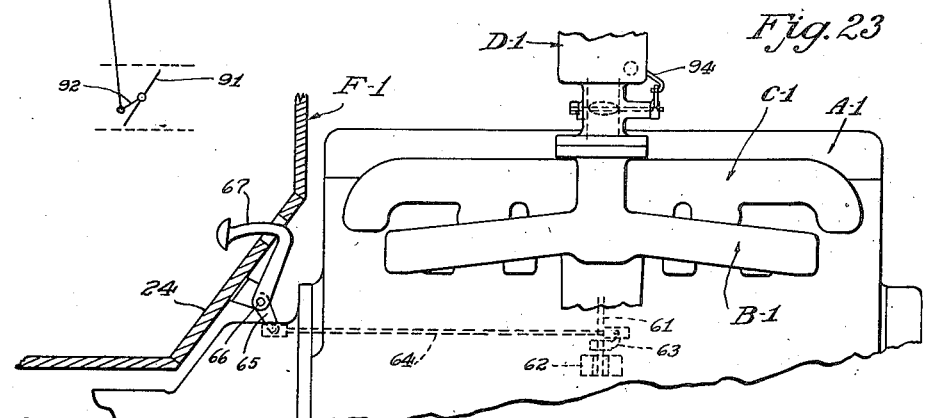
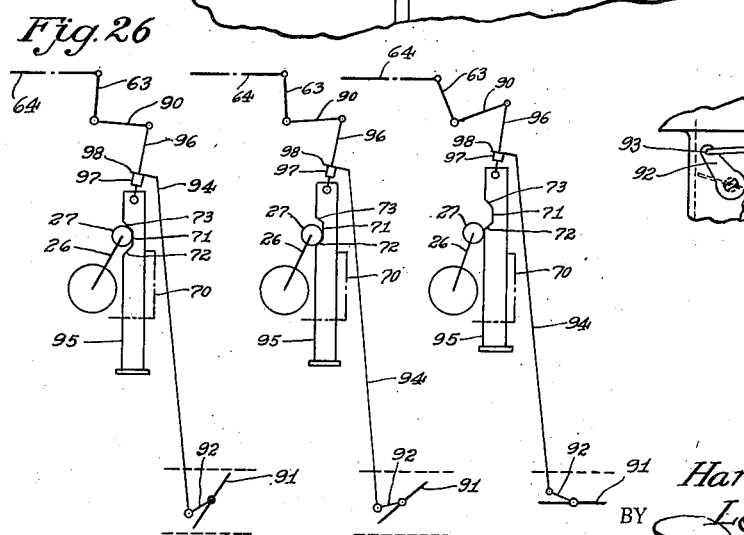
INVENTORS.
Harold H. Timian
Lewis P. Kalb
BY
ATTORNEY.

Oct. 5, 1937.   H. H. TIMIAN ET AL   2,094,860
ENGINE
Filed Dec. 23, 1932    5 Sheets-Sheet 5
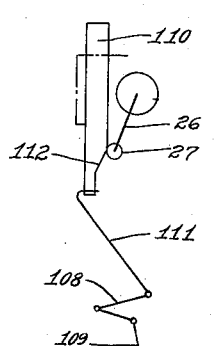
Fig.32
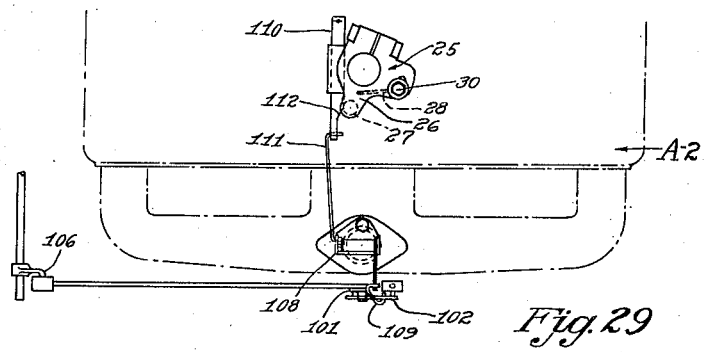
Fig.29
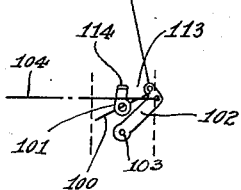
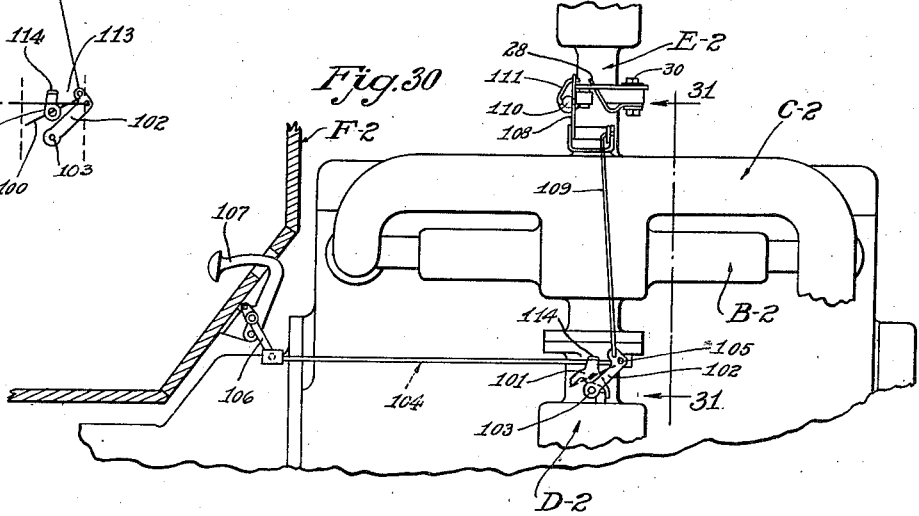
Fig.30
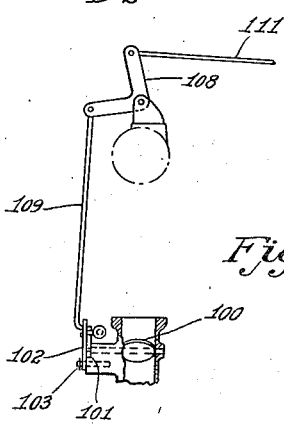
Fig.31
Fig.33    Fig.34
INVENTORS
Harold H. Timian
Lewis P. Kalb
BY
ATTORNEY.

Patented Oct. 5, 1937

2,094,860

UNITED STATES PATENT OFFICE 2,094,860

ENGINE

Harold H. Timian, Detroit, and Lewis P. Kalb, Grosse Pointe Village, Mich., assignors to Continental Motors Corporation, Detroit, Mich., a corporation of Virginia Application December 23, 1932, Serial No. 648,530

15 Claims. (Cl. 123—98)

Our invention relates to engines and more particularly pertains to an ignition timing and carburetor throttle controlling mechanism for controlling engine operation.

An object of our invention is to generally improve engine performance and to obtain relatively greater fuel economy in the operation thereof.

Another object of our invention is to provide an engine ignition timing and carburetor control device for obtaining the aforesaid improved results by providing a mechanism including a single control device connected with said ignition timing device and carburetor throttle valve, said connections being constructed whereby initial actuation of the single control device will adjust the ignition timing independently of the carburetor throttle actuation.

Another object of our invention is to facilitate engine starting and operation of the engine at idling speed by providing an ignition timing and carburetor control mechanism operated to effect a retardation of the ignition timing device for engine idling operation, said mechanism being operated to advance the ignition timing device prior to opening the carburetor throttle for relatively greater engine load conditions.

For a more detailed understanding of our invention reference may be had to the accompanying drawings which are illustrative of certain preferred embodiments of our invention, and in which:

Fig. 1 is a plan view of an engine partly broken away to illustrate our improved engine controlling device as taken substantially on the line 1—1 of Fig. 2, Fig. 2 is a side elevational view thereof showing the means whereby the same can be actuated by the vehicle operator, Fig. 3 is an enlarged fragmentary elevational view of a portion of the carburetor showing the actuating element in a position for engine idling with the spark retarded, Fig. 4 is a diagrammatic illustration of the control mechanism showing the cam means for actuating the ignition timing device, said elements being positioned for engine idling with retarded spark, Fig. 5 is a similar diagrammatic view of the control mechanism showing the ignition timing device advanced, Fig. 6 is a similar diagrammatic view showing the throttle valve partially moved towards its open position with the ignition timing device still advanced, Fig. 7 is a similar diagrammatic view showing the throttle valve fully opened and the ignition timing device retarded, Fig. 8 is a plan view of an engine partly broken away showing a control device of modified construction as taken substantially on the line 8—8 of Fig. 9, Fig. 9 is a side elevational view thereof, Fig. 10 is a fragmentary elevational view of the control mechanism as seen from the section line 10—10 of Fig. 9 and showing the mechanism for connecting the actuating element with the cam means that actuates the ignition timing device, Fig. 11 is a diagrammatic assembly of the controlling mechanism showing the throttle valve positioned for engine idling and the ignition timing device in a retarded position, Fig. 12 is a similar diagrammatic view showing the throttle valve positioned for engine idling and the ignition timing device advanced, Fig. 13 is a similar diagrammatic view showing a carburetor throttle partly opened and the ignition timing device still advanced, Fig. 14 is a similar diagrammatic view showing the carburetor throttle valve fully opened and the ignition timing device in a retarded position, Fig. 15 is a plan view of an engine provided with a downdraft carburetor and showing another modified type of control mechanism for the throttle valve and ignition timing device as taken substantially on the line 15—15 of Fig. 16, Fig. 16 is a side elevational view thereof, Fig. 17 is an enlarged fragmentary elevational view of the throttle valve and means for actuating same, Fig. 18 is a diagrammatic view of the control mechanism assembly showing the throttle valve positioned for engine idling and the ignition timing device in a retarded position, Fig. 19 is a similar diagrammatic view showing the throttle valve positioned for engine idling and the ignition timing device advanced, Fig. 20 is a similar diagrammatic view showing the throttle valve partly opened and the ignition timing device still advanced, Fig. 21 is a similar diagrammatic view showing the throttle valve fully opened and the ignition timing device in a retarded position, Fig. 22 is a plan view of an engine having the down draft carburetor and showing a further modified engine controlling mechanism, the timer being broken away in part, Fig. 23 is a side elevational view thereof, Fig. 24 is a fragmentary elevational view of the throttle valve and lever as seen from the section line 24—24 of Fig. 22, Fig. 25 is a diagrammatic view of the control mechanism assembly showing the throttle valve positioned for engine idling and the ignition timing device in a retarded position, Fig. 26 is a similar diagrammatic view showing the throttle valve positioned for engine idling and the ignition timing device advanced, Fig. 27 is a similar diagrammatic view showing the throttle valve partly opened and the ignition timing device still advanced, Fig. 28 is a similar diagrammatic view illustrating the throttle valve fully opened and the ignition timing device in a retarded position, Fig. 29 is a plan view of an engine of the type employing an up-draft carburetor and showing a modified type of engine controlling mechanism, as taken substantially on the line 29—29 of Fig. 30, Fig. 30 is a side elevational view thereof, Fig. 31 is a side elevational fragmentary view of the control mechanism as seen from the section line 31—31 of Fig. 30, Fig. 32 is a diagrammatic view showing the control mechanism assembly with the throttle valve positioned for engine idling and the ignition timing device in a retarded position, Fig. 33 is a similar diagrammatic view of the engine control mechanism assembly showing the throttle valve positioned for engine idling and the ignition timing device advanced, and Fig. 34 is a similar diagrammatic view of the engine control mechanism assembly showing the throttle valve fully opened and the ignition timing device in a retarded position.

The embodiment of our invention as shown in Figs. 1 to 7 inclusive, comprises in general an engine A having suitable intake and exhaust manifolds B and C, a carburetor D and an ignition timing device E. The engine is preferably adapted for assembly with a vehicle, a portion of which is designated by the reference character F.

The carburetor D is provided with the usual throttle valve 10 mounted on a shaft 11 to which is fixed the throttle lever 12, this lever 12 being preferably supported outside the carburetor casing. An actuating element 13 having in general the oppositely extending arms 14 and 15 is pivotally mounted on the carburetor casing as at 16. The carburetor casing preferably carries a stop 17 constructed for engagement with the arm 18 of the throttle lever for limiting movement of said throttle lever in one direction, said throttle lever having associated therewith a spring or other suitable yielding device 19' for urging the throttle valve towards the idling position as illustrated in Figs. 3, 4 and 5. The throttle lever is preferably provided with an ear or lug 19 adapted to be engaged by the arm 15 of the actuating element when the latter is moved. It will be noticed (Figs. 3 and 4) that the ear 19 is spaced from the arm 15, this clearance permitting an initial movement of the actuating element 13. A rod or other suitable means 20 is connected at one end with the arm 15 as at 21, the other end of said rod 20 being connected with a suitable bell crank 22 adapted to be actuated by the pedal 23 extending preferably through the toe-board 24 into the interior of the vehicle for actuation by the vehicle operator.

The ignition timing device E is provided with an adjustable portion 25 of well known construction, said adjustable portion carrying an arm 26 which supports a roller 27, a spring 28 being adapted to urge the movable portion of the ignition timing device in one direction. Preferably this arm portion 26 is provided with a slot 29 to limit its movement, a bolt or other fastening device 30 being threaded through this slot and anchored to a fixed portion 31 of the ignition timing device as illustrated in Figs. 1 and 2.

Mechanism for adjusting the movable portion of the ignition timing device includes cam means 32 slidably supported by a suitable bracket or support 33, this cam means being connected with the arm 14 of the actuatng element 13 by means of a Bowden wire 34, said Bowden wire being preferably supported by suitable brackets 35 and 36. A spring or other yielding device 37 yieldingly urges the cam means 32 to Fig. 1 position, one end of the spring bearing on the bracket 33 or other suitable fixed portion, and the other end of said spring engaging an abutment 38 carried preferably by the cam means 32. This cam means is provided with a recess 39 forming spaced cam faces 40 and 41. As the cam means is moved by the actuating element 13 by reason of the aforesaid connections connecting the cam means with the arm 14, the cam face 41 is moved into cooperative position with the roller 27, the roller being urged into the recesses 39 by reason of the spring 28. This action moves the arm 26 through a predetermined angle for effecting a predetermined advance of the ignition timing device.

It will be noted that the advancing of the ignition timing device is completed while the actuating element is moved in taking up the clearance between the ear 19 and arm 15. Thus the ignition timing device is advanced while the carburetor throttle valve is still positioned for engine idling (see Fig. 5). Arm 15 of the actuating element is now engaged with the throttle lever and further movement of the actuating element will rotate the throttle lever and open the throttle valve, this further movement of the actuating element moving the cam from the Fig. 5 to the Fig. 6 position. The roller 27 is caused to move along the flat portion 42 of the recess 39 and the definite advance of the ignition timing device is maintained during movement of the mechanism from Fig. 5 to Fig. 6 position. In Fig. 6 it will be noted that the roller 27 is engaged with the cam face 40 and further movement of the actuated element moves the cam means 32 against the resistance of spring 37 into the position as shown in Fig. 7 and also the movement of this actuating element progressively opens the throttle valve, Fig. 7 showing said throttle valve in a fully opened position and the ignition timing device in a retarded position by reason of the fact that the roller 27 has passed over the cam face 40 and now rides upon a high point of the cam.

A reverse movement of the actuating element obviously will return the mechanism through the steps as illustrated in Figs. 5 and 6 to that shown in Fig. 4, the spring 37 being preferably constructed to act upon the mechanism for automatically returning said mechanism to the Fig. 4 position.

It will be noted that the control mechanism herein illustrated is actuated by means of a single manually operated device (pedal 23) by reason of the mechanism connecting this pedal with the actuating element 13. The retardation of the ignition timing device or distributor during engine idling provides for smooth and more efficient engine performance and further, facilitates engine starting. The advancing of the ignition timing device previous to the actuation of the throttle valve, provides for substantially maximum fuel economy and further materially facilitates engine operation for relatively greater engine load operation. In our construction the ignition timing device is adjusted with a late ignition setting for engine idling and for relatively high load engine operation and with an advance ignition setting for engine load operation intermediate engine idling and high load engine operation. This construction is especially suited for engines having yielding motor mountings since the quiet engine operation resulting from the late setting of the ignition for idling decreases the vibrations set forth by the engine during idling operation.

Our device can be successfully incorporated in engines employing the standard governor controlled ignition timing device and results in imparting an ignition timing advance in excess of the normal advance when needed, but which eliminates said excess for relatively high load engine operation.

In Figs. 8 to 14 inclusive, there is illustrated a modified control mechanism adapted for assembly with the engine A constructed substantially similar to the engine illustrated in Fig. 1. The difference between the structure shown in Figs. 8 to 14 and that shown in Figs. 1 to 7, resides in the means for connecting the cam 32 with the actuating element 13. In the first showing we have provided a Bowden wire connection and in this latter showing we have provided a connection consisting of a rod 50 connected at one end with the arm 14 of the actuating element and at the other end to a pivot plate 51 as at 52, this plate acting similarly to a bell crank. A rod 53 connects the plate as at 54 with the cam means 32 as at 55, and the plate 51 is preferably pivoted as at 56 to a bracket 57 supported in this instance on the exhaust manifold C.

The operation of the construction shown in Figs. 8 to 14 is exactly similar to the operation of the control mechanism shown in Figs. 1 to 7 inclusive and therefore a detailed description of each step in the operation is omitted. Corresponding elements of these structures which are identical bear the same reference characters.

The modified control mechanism illustrated in Figs. 15 to 21 inclusive is constructed for assembly with an engine A—1 having an intake manifold B—1, an exhaust manifold C—1, a carburetor D—1 and an ignition timing device E—1. This carburetor is of the down-draft type and the engine control mechanism herein illustrated is especially constructed for assembly with a carburetor of this type which is usually positioned in a horizontal plane substantially aligned with the ignition timing device, both the carburetor and timing device usually projecting upwardly from the top of the engine.

In this modified construction as illustrated in Figs. 15 to 21, we have provided an actuating element 60 supported generally at one side of the engine A—1 as shown in Fig. 15, this actuating element being preferably keyed or otherwise secured to a shaft 61 preferably supported by a bracket 62 secured to the side of the engine. The lower end of rod or shaft 61 preferably carries an arm 63 to which is secured a rod 64, this rod connecting the arm 63 with a crank or lever 65 carried by the rockshaft 66, said rockshaft being adapted to be actuated by means of a pedal 67.

The actuating element 60 is connected with a cam device 68 by means of a link or rod 69, this cam being supported in a bracket or bearing 70 and having a recessed portion 71 forming spaced cam faces 72 and 73 respectively. The throttle valve 74 is carried by a shaft 75 to which is secured a throttle lever 76 that is supported without the carburetor casing. A rod 77 connects the actuating element 60 with the throttle lever 76, said rod 77 preferably being threaded through a connection 78 carried by said lever and having an abutment or other suitable stop 79 carried on the free end of said rod. It will be noted from observing Figs. 15 and 17 that the rod 77 can be moved a definite distance before the abutment 79 contacts with the connection 78, this initial clearance between the connection and abutment providing a lost motion connection between the rod 77 and throttle lever 76.

The operation of this construction is diagrammatically illustrated in Figs. 18 to 21. The initial movement of the actuating element 60 in moving from Fig. 18 to Fig. 19 position, moves the cam 68 and allows the roller 27 carried by the arm 26 of the ignition timing device to move into the recessed portion 71 by riding down the cam face 72, thereby advancing the ignition timing device. During this movement the clearance between the abutment 79 carried by rod 77 and the connection 78 is taken up (see Fig. 19) but the throttle valve has not been moved, the same still being positioned for engine idling operation. Further movement of the actuating element 60 moves the cam and the movement of the element from Fig. 19 to Fig. 20 position partially opens the throttle valve 74, this intermediate position, illustrated in Fig. 20, showing the said throttle valve partially opened and the ignition timing device still advanced. However, the roller 27 is now in contact with the cam face 73 and further movement of the actuating element causes the roller to ride on said cam face and move out of the recess 71 thereby retarding the ignition timing device. In Fig. 21 the mechanism is illustrated for full opened throttle valve condition and for a retarded spark ignition condition. Any suitable spring 80 may be associated with the mechanism for urging the actuating element to the position shown in Fig. 15.

The modified construction illustrated in Figs. 22 to 28 inclusive is adapted for assembly with an engine A—1, similar in construction to the engine illustrated in Fig. 15. In this construction we have provided an actuating element 90 supported and actuated by means similar to the means for actuating element 60 of Fig. 15. The throttle valve 91 is connected with a throttle lever 92, this throttle lever being connected as at 93 with a rod 94 extending transversely across the top of the engine. A cam 95 similar in construction to the cam 68 of Fig. 15 is connected with the actuating element 90 by means of a rod 96, this cam being operated in a manner similar to the cam 68 in the previously described modification of the invention. A collar 97 is preferably secured to the rod 96 and the rod 94 extends adjacent to the rod 96 and is preferably provided with an extension 98 sliding on the rod 96 and adapted to be engaged by the said collar 97. It will be noted in Fig. 22 that a clearance 99 is interposed between the extension 98 and the collar 97 thereby permitting an initial actuation of the cam 95 before the collar engages the extension 98, this clearance providing what we term a lost motion connection. After the collar 97 engages the extension 98, further actuation of the element 90 opens the throttle valve, and after the throttle valve has been partially opened the ignition timing device which has been advanced during the initial movement of the cam 95 is then retarded. The operation of this device is shown in Figs. 25 to 28 inclusive and the positions shown in these figures are respectively similar to the positions shown in Figs. 18 to 21.

In Figs. 29 to 34 inclusive, I have illustrated a further modified type of control mechanism adapted for assembly with an engine A—2 having an intake manifold B—2, an exhaust manifold C—2, a carburetor D—2 and an ignition timing device E—2. The control mechanism herein illustrated is adapted for assembly with a carburetor of the up-draft type as shown and this carburetor is provided with a throttle valve 100 connected with a throttle lever 101 that is mounted outside the carburetor casing. An actuating element 102 is pivotally supported as at 103 by the carburetor casing and is connected with a push and pull rod 104 as at 105, the other end of said rod being connected with a bell crank 106 actuated in the usual manner by a pedal 107. The actuating element 102 is connected with a bell crank 108 by means of a rod 109 and the bell crank is connected with a cam 110 by means of the rod 111.

It will be noted that the movement of the actuating element 102 induces during the first portion of its movement a movement to the cam in one direction and during the latter portion of the movement of said actuating element the cam is moved in a reverse direction for the reason that said actuating element has passed through dead center position. The cam is provided with a cam face 112 and in moving the actuating element from Fig. 32 to Fig. 33 position the roller 27 carried by the arm 26 of the movable portion of said ignition timing device is permitted to ride on the cam face 112 and the ignition timing device is thus advanced a predetermined amount determined by the design of the cam face. When the reverse movement is imparted to the cam during the latter portion of the movement of said actuating element 102, the roller 27 rides on said cam face 112 and the arm 26 is returned to substantially the position shown in Fig. 32, thus retarding the ignition timing device.

It will be noted that the initial movement of the actuating element 102 takes up the clearance 113 between the element and ear or lug 114 carried by the throttle lever 102, and thus, no movement is imparted to the throttle valve during the advancing of the ignition timing device. However, when the actuating element is moved from Fig. 33 to Fig. 34 position, the throttle valve is opened by reason of the positive movement imparted to the throttle lever by reason of the engagement of said actuating element with the ear or lug 114 of the lever. Fig. 34 shows the throttle valve fully opened and the ignition timing device retarded.

In this modified construction shown in Figs. 29 to 34 inclusive, there is no dwell in the cam and the adjustment of the ignition timing device is preferably a progressive advancing of the same, followed immediately by a progressive retardation.

The results obtained by means of these mechanisms for adjusting the ignition timing device as herein illustrated, are substantially the same as regards engine operation, fuel economy, efficiency and ease of engine starting and smoothness of engine operation at idling speeds.

It will be apparent to those skilled in the art to which the invention pertains, that various modifications and changes may be made therein without departing from the spirit of the invention or from the scope of the appended claims.

What we claim as our invention is:

1. In a structure of the character described for an engine having an ignition timing device and a device for controlling fuel mixture supply, means for operating said devices including a manually operated actuating element, cam means operatively connected with said element and acting on said ignition timing device to adjust same, and connections between said element and said device for controlling the fuel mixture supply, said connections including lost motion means whereby to adjust said ignition timing device prior to the actuation of said device for controlling the fuel mixture supply upon actuation of said operating means from idling position.

2. In a structure of the character described for an engine having an ignition timing device and a device for controlling fuel mixture supply, means for operating said devices including an actuating element, cam means operatively connected with said element and acting on said ignition timing device to adjust same, and connections between said element and said device for controlling the fuel mixture supply, said connections including lost motion means operable to adjust said ignition timing device during a fixed engine idling operation and prior to the opening of said fuel mixture supply controlling means.

3. In a structure of the character described for an engine having an ignition timing device and a device for controlling fuel mixture supply, means for operating said devices including manually operated devices for effecting an adjustment of said ignition timing device prior to adjusting said fuel mixture control device from idling position, said operating devices including a cam means operating said ignition timing device.

4. In a structure of the character described for an engine having an ignition timing device and a device for controlling fuel mixture supply, means for operating said devices including devices for effecting an adjustment of said ignition timing device prior to adjusting said fuel mixture control device from idling position, said operating devices including a reciprocating cam operating said ignition timing device.

5. In a structure of the character described for an engine having an ignition timing device and a device for controlling fuel mixture supply, means for operating said devices including devices for effecting an adjustment of said ignition timing device prior to adjusting said fuel mixture control device from idling position, said operating devices including an actuating element and cam means operatively connected therewith, said cam means actuating said ignition timing device.

6. In a structure of the character described for an engine having an ignition timing device and a device for controlling fuel mixture supply, means for operating said devices including devices for effecting an adjustment of said ignition timing device prior to adjusting said fuel mixture control device from idling position, said operating devices including cam means having a recessed cam portion, a cam engaging arm carried by said ignition timing device and yieldingly urged into engagement with the cam, the movement of said cam means bringing said recessed cam portion into cooperative relation with said arm whereby to permit the arm to move for adjusting said ignition timing device.

7. In a structure of the character described for an engine having an ignition timing device and a device for controlling fuel mixture supply, means for operating said devices including devices for effecting an adjustment of said ignition timing device prior to adjusting said fuel mixture control device from idling position, said operating devices including cam means having spaced actuating cam faces, a cam engaging arm carried by said ignition timing device and yieldingly urged into engagement with the cam, the movement of said cam effecting the successive engagement of said actuating cam faces and arm whereby to successively advance and retard said ignition timing device.

8. In a structure of the character described for an engine having an ignition timing device and a device for controlling fuel mixture supply, means for operating said devices including devices for effecting an adjustment of said ignition timing device prior to adjusting said fuel mixture control device from idling position, said operating devices including cam means having an actuating cam face for effecting an adjustment of said ignition timing device, said ignition timing device including an actuating arm adapted for engagement with said actuating cam face.

9. In a structure of the character described for an engine having an ignition timing device and a device for controlling fuel mixture supply, means for operating said devices including devices for effecting an adjustment of said ignition timing device prior to adjusting said fuel mixture control device from idling position, said operating devices including cam means adapted for actuation to advance said ignition timing device during a fixed engine idling operation.

10. In a structure of the character described for an engine having an ignition timing device and a device for controlling fuel mixture supply, means for operating said ignition timing device including cam means for successively advancing and retarding said ignition timing device, and connections between said operating means and the fuel mixture control device, said cam means and connections operating in timed relation to progressively open said fuel mixture control means from idling position subsequently to the advancing of the ignition timing device, said cam means operating to again retard said ignition timing device subsequently to the initial opening of said fuel mixture control means.

11. In a structure of the character described for an engine having an ignition timing device, a carburetor and an associated device for controlling the fuel mixture supply to said engine including a throttle valve and throttle lever, means for operating said devices including an actuating element movably supported by said carburetor casing adjacent to said throttle lever, connections between said element and ignition timing device, said element having a clearance with respect to said throttle lever and adapted to engage same when moved to take up the clearance therebetween, and means for actuating said element, the first portion of the movement of said element taking up said clearance and advancing said ignition timing device, further movement of said element progressively opening said throttle valve, the connections between said element and ignition timing device including cam means acting to effect the aforesaid advancing of said ignition timing device prior to opening of said throttle valve and to again retard said ignition timing device during a portion of the opening movement of said throttle valve.

12. In a structure of the character described for an engine having an ignition timing device and a device for controlling fuel mixture supply including a throttle valve, and means for operating said devices, said means including an actuating element and cam means for actuating said ignition timing device, a Bowden wire connecting said cam means with said actuating element, and a lost motion connection between said element and throttle valve whereby to permit the adjustment of said ignition timing device prior to adjustment of said throttle valve from idling position.

13. In a structure of the character described for an engine having an ignition timing device and a device for controlling fuel mixture supply including a throttle valve, and means for operating said devices, said means including an actuating element and cam means for actuating said ignition timing device, connections between said cam and actuating element including push and pull rods and intermediate pivotally supported bell cranks, and a lost motion connection between said element and throttle valve whereby to permit the adjustment of said ignition timing device prior to adjustment of said throttle valve from idling position.

14. In a structure of the character described for an engine having an ignition timing device and a device for controlling fuel mixture supply including a throttle valve, and means for operating said devices, said means including an actuating element and cam means for actuating said ignition timing device, a rod connecting said element with the cam means, a throttle lever connected with said throttle valve, a rod connecting said element with said throttle lever and including a lost motion connection, and spring means urging said throttle valve towards a predetermined idling positon, said lost motion connection permitting an initial adjustment of said ignition timing device prior to the openng of said throttle valve from idling position.

15. In a structure of the character described for an engine having an ignition timing device and a device for controlling fuel mixture supply including a throttle valve, and means for operating said devices, said means including an actuating element and cam means for actuating said ignition timing device, a rod connecting said element and the cam means and carrying a collar, a throttle lever connected with said throttle valve, a rod connected with said throttle lever, the other end of said rod having a lost motion connection with said collar, said lost motion connection permitting an initial adjustment of said ignition timing device prior to the opening of said throttle valve from idling position.

HAROLD H. TIMIAN.
LEWIS P. KALB.